Patented Oct. 9, 1928.

1,686,952

UNITED STATES PATENT OFFICE.

KENNETH R. BROWN, OF TAMAQUA, PENNSYLVANIA, ASSIGNOR TO ATLAS POWDER COMPANY, OF WILMINGTON, DELAWARE, A CORPORATION OF DELAWARE.

GELATINIZED EXPLOSIVE COMPOSITION.

No Drawing.   Application filed September 10, 1926.  Serial No. 134,752.

This invention relates to improvements in the manufacture of blasting explosives containing nitroglycerine and nitro-cellulose and which are commonly known to those versed in the art, as gelatins or gelatin dynamites.

Nitrated sugars dissolved in trinitroglycerine or mixtures of trinitroglycerine and tetranitrodiglycerine have been used extensively in the manufacture of commercial blasting explosives. The addition or presence of nitrated sugars in nitroglycerine mixtures reduces the cost of these mixtures markedly, due to the difference in cost between glycerine and sugar, cane sugar—for example. Therefore, from an economical standpoint it would be to an advantage to extend the use of nitrated sugars as much as possible. However, the use of nitrated sugars in commercial explosives is limited by at least two factors.

First: On account of the instability of nitrated sugars, it is not feasible to nitrate sugar alone. In order to produce a stable product, sugars are dissolved in glycerine and the mixture nitrated. Of all the nitrated sugars, nitrated cane sugar is the most adaptable for use in commercial explosives. However, owing to the solubility limitations of cane sugar in glycerine it is impractical to dissolve more than 20%. Since the practical yield of nitroglycerine is greater than that of nitrated sugars, the amount of nitrated sugar present in the explosive mixture is limited to less than 20%.

Second: The application of nitrated sugar-nitroglycerine mixtures in the manufacture of gelatin dynamites has heretofore proven very unsuccessful. It has been found that gelatins containing nitrated sugar-nitroglycerine mixtures were more unstable than those containing straight nitroglycerine. On storage, decomposition set in which in turn caused the nitroglycerine mixture to exude or leak from the gelatin.

Improved methods in the washing, neutralizing and stabilizing of nitroglycerine-nitrated sugar mixtures have to a great extent alleviated the tendency towards decomposition. However, it is a known fact that nitrated sugars dissolved in nitroglycerine retard gelatinization. The operator often times tends toward over-gelatinization which produces a hard gelatin. Also, on account of the relative low rate of gelatinization, considerable after gelatinization takes place on storage. This is a source of serious complaints on the part of the consumer.

The object of my invention, therefore, is to make it possible to use nitrated sugars in the manufacture of commercial explosives of the gelatin or gelatin dynamite type and thereby take advantage of the saving in cost and at the same time produce a gelatin having properties superior to those of gelatins now on the market.

It is known that ethylene glycol dinitrate, more commonly known as nitroglycol, is a better solvent for nitrocellulose than nitroglycerine or a mixture of nitroglycerine and tetranitrodiglycerine. Now, I have conceived the idea of adding ethylene glycol dinitrate to nitroglycerine-nitrated sugar mixtures to accelerate the gelatinization of the nitroglycerine-nitrated sugar mixture with nitrocotton, in order to produce a gelatin having more desirable properties, at a great saving in cost of manufacture.

I have found by the use of this idea that I am able to use nitroglycerine-nitrated sugar mixtures satisfactorily in the manufacture of blasting explosives of the gelatin or gelatin dynamite type. I have found that relatively small amounts of ethylene glycol dinitrate will accelerate the gelatinization of this nitroglycerine mixture so that the time of gelatinization will be even shorter than that required for gelatinizing straight trinitroglycerine with nitrocotton.

I have also found that relatively small amounts of nitroglycol will produce a gelatin which remains plastic and soft on storage, thereby overcoming one of the principal disadvantages of the nitroglycerine-nitrated sugar composition for gelatin dynamite manufacture.

Gelatin dynamites on the market at the present time usually contain trinitroglycerine or mixtures of trinitroglycerine and tetranitrodiglycerine. These gelatins are generally satisfactory when subjected to ideal storage conditions. However, when stored under adverse conditions, such as in a hot humid climate, these gelatins as a rule deteriorate and in the course of a few months are in such a condition that they are absolutely valueless for blasting purposes. However, by the use of my invention, explosives of the gelatin or gelatin dynamite type can be made which will stand up under the poorest storage conditions. In fact, I have found that by using my invention, gelatins can be made which will show no great decrease in strength, velocity or sensitiveness when stored in a humid atmosphere at elevated temperatures over a long period of time. Other gelatins have failed in this test.

Also, when explosives of the gelatin type are stored at elevated temperatures, the gelatins after a time show a tendency to exude and often become so bad that the nitroglycerine runs out of the powder. Now by using my process, gelatin dynamites can be made which show no tendency toward exudation when stored in hot climates.

In the manufacture of blasting explosives it is very desirable to use a nitroglycerine mixture which will not freeze or solidify when subjected to extremely cold temperatures, such as are experienced in winter climates. In order to increase the freezing resistance of these nitroglycerine explosives it is customary to use tetranitrodiglycerine dissolved in trinitroglycerine to depress the freezing point. Diglycerine is made by polymerizing glycerine. A mixture of diglycerine and glycerine is usually nitrated in such proportions as to give the desired freezing results. However, it will be readily seen that such a mixture is more costly than glycerine or trinitroglycerine and if it is desired to manufacture a very low freezing explosive it is necessary to raise the percentage of tetranitrodiglycerine to such an extent that the cost is almost prohibitive. However, by the use of my invention I am able to manufacture a very low freezing explosive at a cost which is much lower than is possible by using tetranitrodiglycerine.

In carrying out my invention, I may, for example, nitrate the glycol and glycerine-sugar separately and mix the nitrated products together after they have been washed and neutralized. One example of the composition of my explosive mixture is as follows:

1. 14.4% nitrated sugar, 10% ethylene glycol dinitrate, 75.6% trinitroglycerine.

I may also mix the glycol with the glycerine-sugar mixture and nitrate the whole mixture or I may dissolve the sugar in a glycerine-glycol mixture and then nitrate. By dissolving sugar in a glycol-glycerine mixture I can increase the amount of sugar in the resultant mixture because the solubility of sugar is greater in ethylene glycol than in glycerine. A suitable example of a composition before nitration is—

2. 20% cane sugar, 10% ethylene glycol, 70% glycerine.

While I have described my invention and have given specific and detailed examples, I do not wish to limit myself to the exact conditions given herein. In my specific example I have specified cane sugar. However, I do not wish to limit myself to this particular sugar, but may use glucose, mannose, xylose and any other sugar or mixtures of sugars. Also, I wish it to be understood that while I prefer to use ethylene glycol, the use of other glycols such as propylene, trimethylene, etc., is contemplated and is within the scope of my invention, either singly or in admixture with each other to form the glycol constituent of the above described glycerine-sugar explosive composition.

While I have described cane sugar as the preferred type of carbohydrate it is manifest that the advantages inherent in the use of the glycols to promote the gelatinization of the composition is not dependent upon the use of this particular carbohydrate but would be present with a large range of carbohydrates commonly employed in explosive manufacture, such, for example, as certain of the starches.

Although I have shown the advantages of using my explosive composition in the manufacture of gelatin or gelatin dynamite, it is apparent that there are advantages which will make it desirable to use this composition to manufacture commercial blasting explosives of other types, such as the dynamites and permissible types. I also wish to include these within the scope of my invention.

My invention further includes the employment of nitrated polyglycerine, tetranitrodiglycerine for example, as an element of the composition. That is, in example No. 1 above, nitrated polyglycerine or tetranitrodiglycerine could be substituted for part of the trinitroglycerine or could be used in addition thereto without departure from the invention.

Having described my invention, what I claim and desire to secure by Letters Patent is—

1. The method of promoting the gelatinization of dynamites containing nitrocellulose-nitro-glycerine-nitrated sugar mixtures which comprises incorporating therein a nitro glycol.

2. The method of promoting the gelatinization of dynamites containing nitrocellulose-nitro-glycerine-nitrated sugar mixtures which comprises incorporating therein ethylene glycol dinitrate.

3. A gelatinized explosive composition containing nitro-cellulose, a nitro-carbohydrate, tri-nitro-glycerine, and a nitro-glycol.

4. A gelatinized explosive composition containing nitro-cellulose, nitrated cane sugar, tri-nitro-glycerine, a nitrated poly glycerine, and a nitro-glycol.

5. A gelatinized explosive composition containing nitro-cellulose, nitrated cane sugar, tri-nitro-glycerine, tetranitrodiglycerine, and ethylene glycol dinitrate.

6. An explosive nitrated glycerine-sugarcotton composition containing a nitrated glycol to promote gelatinization of the composition.

7. An explosive nitrated glycerine-sugar-cotton composition having ethylene glycol dinitrate incorporated therein for the purposes set forth.

8. A gelatin dynamite comprising nitrated glycerine, nitrated cotton, a nitrated sugar and a nitro-glycol.

9. A gelatin dynamite, comprising nitrocellulose, in combination with nitrated sugar, nitro-glycerine and a nitro-glycol in substantially the following proportions: 14.4% nitrated sugar, 10% nitro-glycol, 75.6% nitro-glycerine.

10. A gelatin dynamite, comprising nitrocellulose, in combination with 14.4% nitrated sugar, 10% ethylene glycol dinitrate, 75.6% trinitroglycerine.

11. The herein described method of making a gelatin dynamite, which consists of adding together separately nitrated sugar-glycerin and nitro-glycol mixtures and incorporating nitro-cellulose therewith.

12. The herein described method of manufacturing a gelatin dynamite, which consists of separately nitrating a glycol and a glycerine-sugar mixture, and mixing such nitrated products together after they have been washed and neutralized, and incorporating nitrocellulose therewith, the nitro-glycol entering into explosive combination with the whole and serving to bring about such gelatinization of the mass as will produce a gelatin dynamite which will remain soft under storage, at elevated temperatures.

In testimony whereof I affix my signature.

KENNETH R. BROWN.